United States Patent Office 3,083,569
Patented Apr. 2, 1963

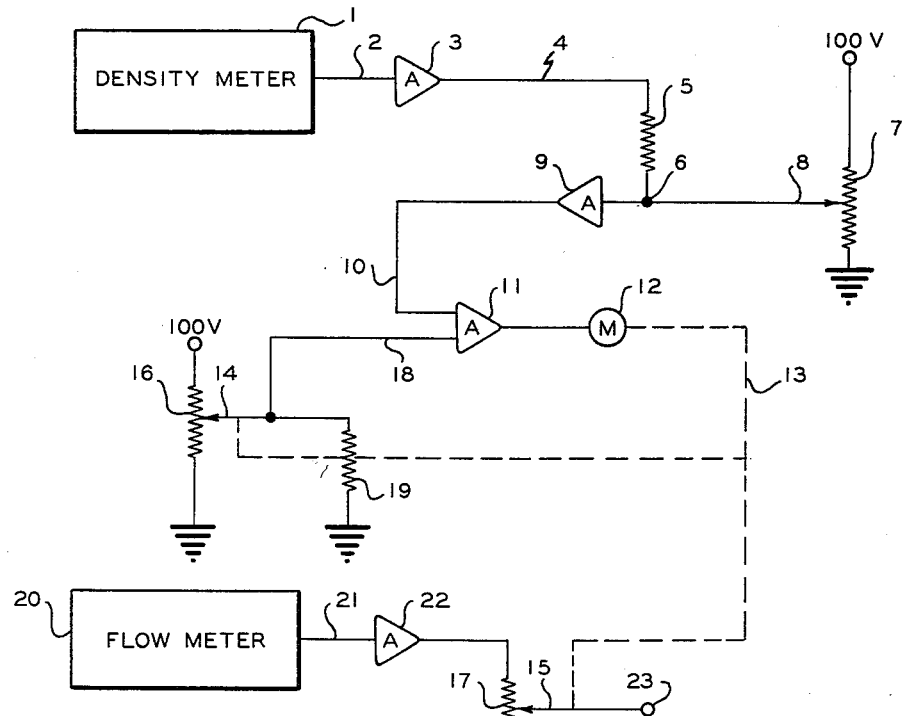
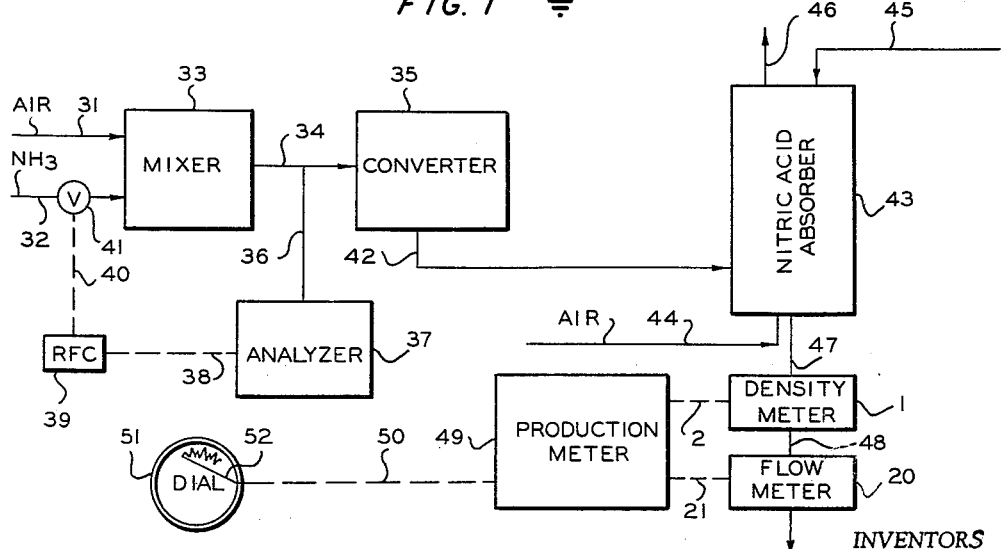
FIG. 1
FIG. 2
INVENTORS
J.C. THOMAS
L.W. MORGAN
BY Hudson and Young
ATTORNEYS though the amount of the component in the liquid stream is proportional to

3,083,569
SYSTEM FOR METERING FLOW
John C. Thomas, Phillips, Tex., and Lyman W. Morgan, Golden, Colo., assignors to Phillips Petroleum Company, a corporation of Delaware
Filed Dec. 1, 1958, Ser. No. 777,261
5 Claims. (Cl. 73—194)

This invention relates to an improved metering system. In one aspect, this invention relates to an improved metering system for determining units of mass of a stream passing a given point per unit of time. In one of its more specific aspects, this invention relates to a means for determining production from a process or feed to a process in terms of units of mass per unit of time.

In many processes relating to chemical engineering and industrial chemistry, it is desirable to determine continuously and to record the amount of a component of a liquid stream where the concentration of the component varies or the total flow of the stream varies.

It is an object of this invention to provide a meter for the continuous determination of the quantity of a component passing in a liquid stream past a particular point. It is also an object of this invention to provide a meter for continuously determining the quantity of the component contained in the moving stream wherein the quantity of component contained therein is proportional to the density of the stream. It is a further object of this invention to provide a production meter for the continuous determination of the production of nitric acid produced in a nitric acid plant. Other objects and advantages will be apparent to one skilled in the art upon studying this disclosure including the drawing wherein:

FIGURE 1 of the drawing is a diagrammatic sketch of the electrical circuit of the meter system of the invention; and FIGURE 2 is a diagrammatic sketch of a nitric acid plant having the meter system of the invention incorporated therein.

Broadly, the invention is directed to a means for continuously determining the rate at which a component of a liquid stream passes a given point, where the amount of the component in the liquid stream is proportional to the density of the stream, by continuously determining the density of the stream, continuously determining the rate of flow of the stream, and by multiplying these two factors to produce rate of flow of the given component as units of mass per unit of time. The meter which comprises the means of the invention can be used for continuously measuring the rate of production of a process or it can be used to continuously measure the amount of a reactant passed to a process. The meter can be used, for example, to determine and record the pounds per hour of ammonia in a flowing aqueous ammonia stream. The meter can be used for determining the production rate of inorganic acids such as sulfuric acid, hydrochloric acid, nitric acid, phosphoric acid, and the like. The meter has particular utility in the determination of the production rate of nitric acid in a nitric acid plant.

In the production of nitric acid from ammonia, the ammonia gas is first catalytically oxidized to oxides of nitrogen, principally nitric oxide, and the oxides of nitrogen produced together with an excess of air, with which the nitric oxide reacts to form nitrogen dioxide, are subsequently absorbed in water to produce nitric acid. In the usual process for the production of nitric acid from ammonia, the gases, rich in nitric oxide, from the oxidation chambers in which the ammonia is oxidized, are passed under atmospheric or higher pressure together with an excess of air into an oxidation chamber, where the nitric oxide is oxidized to nitrogen dioxide. The nitrogen dioxide-containing gas mixture is then passed through an absorption column in countercurrent flow relationship to a current of water, and the resulting nitric acid is recovered from the process.

In order to obtain maximum efficiency from the process, it is essential that the rate of production of nitric acid be continuously determined so that variables affecting the efficiency of the process, and therefore, the rate of production of nitric acid, be manipulated to obtain maximum nitric acid production. The meter of this invention provides an excellent means for continuously and accurately determining the rate of nitric acid production so that the process variables can be continuously manipulated to maintain nitric acid production at the maximum value.

In order to describe the invention with more particularity, reference is now made to the drawing, particularly to FIGURE 1, wherein the electrical circuit for the meter is illustrated diagrammatically. An electrical signal proportional to the density is produced by density meter 1, which can be any instrument for continuously measuring the density of the fluids such as the Densitrol (trademark) available from Precision Thermometer and Instrument Company, Philadephia, Pennsylvania, and passes by conductor 2 to amplifier 3 where it is amplified to a suitable value. The signal then passes by means of conductor 4 and its associated attenuating resistor 5 to summing junction 6. Potentiometer 7 is connected at one end to a voltage source for example 100 volts and at its other end to ground. Its contactor 8 is connected to summing junction 6. Adjustment to the contactor 8 of potentiometer 7 calibrates the signal of meter 1 so that the signal at summing junction 6 is directly representative of concentration; for example, 55 volts at summing junction 6 may represent 55 weight percent acid. The signal from summing junction 6 passes by way of summing amplifier 9 and conductor 10 to a servo amplifier 11 and its associated servo motor 12. The servo motor 12 is mechanically linked by shaft 13 to the contactors 14 and 15 of potentiometers 16 and 17, respectively. Potentiometer 16 is connected at one end to a voltage source, for example, 100 volts and at its other end to ground. Its contactor 14 is connected by conductor 18 to the input of servo amplifier 11 and by loading resistor 19 to ground. As best described, the servo amplifier 11 will cause the servo motor 12 to rotate shaft 13 and associated contactor 14 of potentiometer 16 such that the relative position of shaft 13 represents acid concentration.

An electrical signal proportioned to acid flow rate passes from flow meter 20, which can be any electrical type flow meter producing a linear signal proportioned to rate of flow, such as, for example, the Potter flow meter, manufactured by the Potter Aeronautical Corporation, Union, New Jersey, by means of conductor 21 to amplifier 22 and thence to one end of potentiometer 17, the other end of which is connected to ground. Contactor 15 of potentiometer 17 has been positioned by shaft 13 to represent the acid concentration, and thus the signal from terminal 23, which is connected to contactor 15, represents the product of flow times concentration, for pure acid flow rate. The signal from terminal 23 can be passed to a recorder, for example, a Brown "ElectroniK" recorder, such as described in Minneapolis-Honeywell Catalog 15—13, copyright 1948, by Brown Instrument Company, Philadelphia, Pennsylvania. The recorder can be calibrated to record any desired unit of mass per unit of time such as pounds per hour or tons per day of 100 percent nitric acid.

FIGURE 2 is a schematic flow diagram of a nitric acid plant having incorporated therein the production meter of the invention. In FIGURE 2, ammonia passes via conduit 32 and air passes via conduit 31 to mixer 33. The mixture of air and ammonia passes via conduit 34 to converter 35. A portion of the mixture is taken via conduit 36 to analyzer 37 wherein the ratio of ammonia to air is determined and a signal proportional to this ratio is passed via conductor 38 to ratio flow controller 39 which manipulates, by means of mechanical linkage 40, the motor valve 41 in conduit 32. The effluent from converter 35 containing oxides of nitrogen is passed via conduit 42 to nitric acid absorber 43 and is contacted therein by air, admitted via conduit 44, and water admitted via conduit 45 to produce therein the nitric acid. Off-gases are removed via conduit 46. Nitric acid is removed from the bottom of absorber 43 via conduit 47 and passes through density meter 1, conduit 48 and flow meter 20. The signals from density meter 1 and from flow meter 20 are passed via conductors 2 and 21, respectively, to production meter 49 which comprises the circuit illustrated in FIGURE 1. The signal produced by production meter 49 is passed by means of conductor 50 to a recorder 51 where the production rate is recorded on the dial of the recorder 51 by pen 52.

The density meter can be calibrated in terms of absolute density or in terms of specific gravity, as desired.

The ammonia-air ratio analyzer 37 is described in co-pending application Serial No. 777,246, filed December 1, 1958, by L. W. Morgan.

The following specific embodiment of the invention will further serve as an aid in understanding the invention but is not to be construed as limiting the invention.

*Example*

A nitric acid plant is producing an aqueous solution of nitric acid at the rate of 15 gallons per minute as indicated by the flow meter and the solution has a specific gravity of 1.346 as indicated by the density meter. This indicates that the solution contains 54.89 weight percent of nitric acid. Therefore, the plant is producing at the rate of 168 pounds per minute of 55 percent nitric acid or at the rate of 92.3 pounds per minute of 100 percent nitric acid. This rate of production is determined by the multiplying circuit of the production meter and is recorded on the chart. The chart on the production meter can be calibrated to record production as pounds per minute, pounds per hour, tons per hour, or tons per day, or any other convenient record of production.

Reasonable modifications and variations are possible within the scope of the present disclosure without departing from the spirit and scope of the invention.

That which is claimed is:

1. In a nitric acid plant wherein nitric acid is produced as a stream of aqueous nitric acid, an improved meter for continuously indicating the production of 100 percent nitric acid which comprises, in combination, means for continuously determining the flow rate of said stream and for producing an electrical signal proportional to said flow rate; means for determining the specific gravity of said stream and for producing an electrical signal proportional to said specific gravity; a servo amplifier and an associated servo motor; a first potentiometer connected at one end to a fixed voltage and at the other end to ground; means to supply the signal from the contactor of said first potentiometer to said servo amplifier; a summing junction; means to supply the signal proportional to specific gravity of said stream to said summing junction; a second potentiometer connected at one end to a fixed voltage and at the other end to ground and having its contactor connected to said summing junction and positioned on said second potentiometer so that the signal from said second potentiometer is representative of a reference nitric acid concentration of said stream; a summing amplifier; means to supply the signal from said summing junction to said summing amplifier; means to supply the signal from said summing amplifier to said servo amplifier; a third potentiometer connected at one end to the signal proportional to the flow rate of said stream and connected at the other end to ground; a mechanical linkage between said servo motor and the contactors of said first and third potentiometers for simultaneously adjusting the contactors of said first and third potentiometers; and means for continuously indicating a signal derived from the contactor of said third potentiometer in units of weight of nitric acid per unit of time.

2. In a nitric acid plant wherein nitric acid is produced as a stream of aqueous nitric acid, an improved meter comprising means for continuously determining the flow rate of said stream and for producing an electrical signal proportional to said flow rate; means for continuously determining the specific gravity of said stream and for producing an electrical signal proportional to said specific gravity; a summing junction; means to pass the signal proportional to specific gravity to said summing junction; a potentiometer connected at one end to a fixed voltage and at the other end to ground and having its contactor connected to said summing junction and positioned on said potentiometer so that the signal from said potentiometer is representative of a reference nitric acid concentration of said stream and the signal from said summing junction is representative of the nitric acid concentration of said stream; a summing amplifier; means to pass the signal from said summing junction to said summing amplifier; means for multiplying electrically the signal proportional to flow rate by the signal proportional to nitric acid concentration and producing an electrical signal proportional to the product of said signals; and means for continuously indicating the value of the signal from said multiplying means as nitric acid production in units of weight per unit of time.

3. The meter of claim 2 wherein the indicated value is continuously recorded.

4. Apparatus for continuously determining the flow rate of a first component of a two-component liquid stream wherein the specific gravities of the components differ, which comprises means for continuously determining the specific gravity of said stream and for producing an electrical signal proportional to said specific gravity; a summing junction; means to pass the signal proportional to specific gravity to said summing junction; a potentiometer connected at one end to a fixed voltage and at the other end to ground and having its contactor connected to said summing junction and positioned on said potentiometer so that the signal from said potentiometer is representative of a reference concentration of said first component in said stream and the signal from said summing junction is representative of the concentration of the first component in said stream; a summing amplifier; means to pass the signal from said summing junction to said summing amplifier; means for continuously determining the flow rate of said stream and for producing an electrical signal proportional to said flow rate; means for multiplying the signal proportional to flow rate by the signal proportional to concentration of said first component in said liquid stream and for producing an electrical signal proportional to the product of said signals; and means for continuously indicating the result in terms of units of weight of said first component per unit of time.

5. A meter for continuously determining a first component of a two-component liquid stream in terms of units of mass per unit of time which comprises, in combination, means for continuously determining the specific gravity of said stream and producing an electrical first signal which is proportional to said specific gravity; a summing junction; means to pass the signal proportional to specific gravity to said summing junction; a potentiometer connected at one end to a fixed voltage and at the other end to ground and having its contactor connected to said summing junction and positioned on said potentiometer so that the signal from said potentiometer is representative of a reference concentration of said first component in said stream and the signal from said summing junction is representative of the concentration of the first component in said stream; a summing amplifier; means to pass the signal from said summing junction to said summing amplifier; means for continuously determining the flow rate of said stream and producing an electrical second signal which is proportional to said flow rate; a resistor; means for passing said second signal through said resistor to ground; a contact means in movable contact with said resistor; means operatively connected to said movable contact and actuated by said first signal to move said contact in response to changes in the value of said first signal; and means for continuously indicating an electrical signal produced by said contact and representative of units of weight of said first component per unit of time.

References Cited in the file of this patent

UNITED STATES PATENTS

| | | |
|---|---|---|
| 2,031,852 | Poillot | Feb. 25, 1936 |
| 2,222,551 | Ziebolz et al. | Nov. 19, 1940 |
| 2,363,690 | Razek | Nov. 28, 1944 |
| 2,718,144 | Hornfeck | Sept. 20, 1955 |
| 2,736,201 | Ohlsen et al. | Feb. 28, 1956 |
| 2,758,477 | Haeber | Aug. 14, 1956 |
| 2,767,580 | Bevins et al. | Oct. 23, 1956 |
| 2,767,582 | Bartelink | Oct. 23, 1956 |
| 2,772,567 | Boden et al. | Dec. 4, 1956 |
| 2,817,967 | Meyers | Dec. 31, 1957 |
| 2,859,619 | Fellows | Nov. 11, 1958 |
| 2,901,173 | Clicques | Aug. 25, 1959 |

OTHER REFERENCES

Pages 2200 and 2220–2223 from Scott's Standard Methods of Chemical Analysis, 5th edition, edited by Howell Furman, published by Van Nostrand in 1939. Copy available in U.S. Patent Office Scientific Library.

Page 164 from "Introduction to General Inorganic Chemistry," by Alexander Smith, published by The Century Company in 1906. Call No. QD 151 S64, 1906, U.S. Patent Office Scientific Library.